United States Patent
Aten

[11] 3,950,072
[45] Apr. 13, 1976

[54] INSTRUMENT PANEL REFLECTING APPARATUS

[76] Inventor: Robert M. Aten, 9567 Geyser Ave., Northridge, Calif. 91324

[22] Filed: Dec. 16, 1974

[21] Appl. No.: 533,083

[52] U.S. Cl. .................. 350;110; 350/115; 353/14
[51] Int. Cl.² ........................................ G02B 27/02
[58] Field of Search ........... 350/110, 113, 114, 115, 350/175 SL, 190, 20, 175, 14, 276 SL; 353/40, 41, 14; 250/203 R

[56] References Cited
UNITED STATES PATENTS

| | | | |
|---|---|---|---|
| 1,975,302 | 9/1930 | Van Albada | 350/276 SL |
| 2,198,714 | 4/1940 | Williams | 350/114 |
| 2,685,222 | 8/1954 | Hart | 350/115 |
| 2,686,455 | 8/1954 | Porsche | 353/14 |

Primary Examiner—John K. Corbin
Assistant Examiner—B. Wm. de los Reyes

[57] ABSTRACT

A reflecting apparatus for use with vehicle instrument panels to permit the operator of the vehicle to view instrument indicia when direct viewing thereof is obstructed by the vehicle steering column and/or wheel. A reflecting member is aligned substantially parallel to the instrument panel. The reflecting member has a semicircular profile, the radius of the reflecting member being substantially uniform along the longitudinal length thereof. The reflecting member is pivotal about a point along the longitudinal axis thereof, the pivoting point of the reflecting member being other than the center of curvature of the reflecting member. The reflecting member is typically mounted below the instrument indicia and intermediate the operator of the vehicle and the instrument panel. The relative position of the reflecting member with respect to the instrument indicia provides a noninverted image when viewed by the vehicle operator.

4 Claims, 6 Drawing Figures

U.S. Patent   April 13, 1976   3,950,072
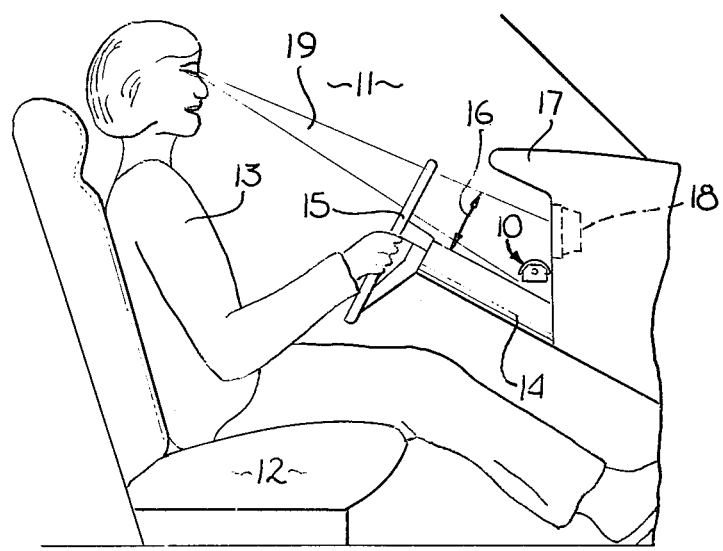
Fig. 1
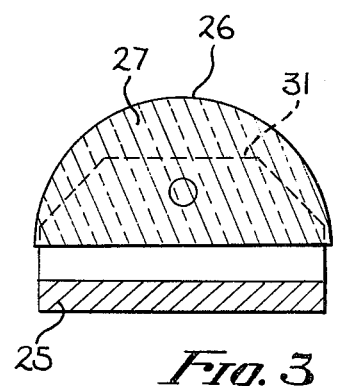
Fig. 3
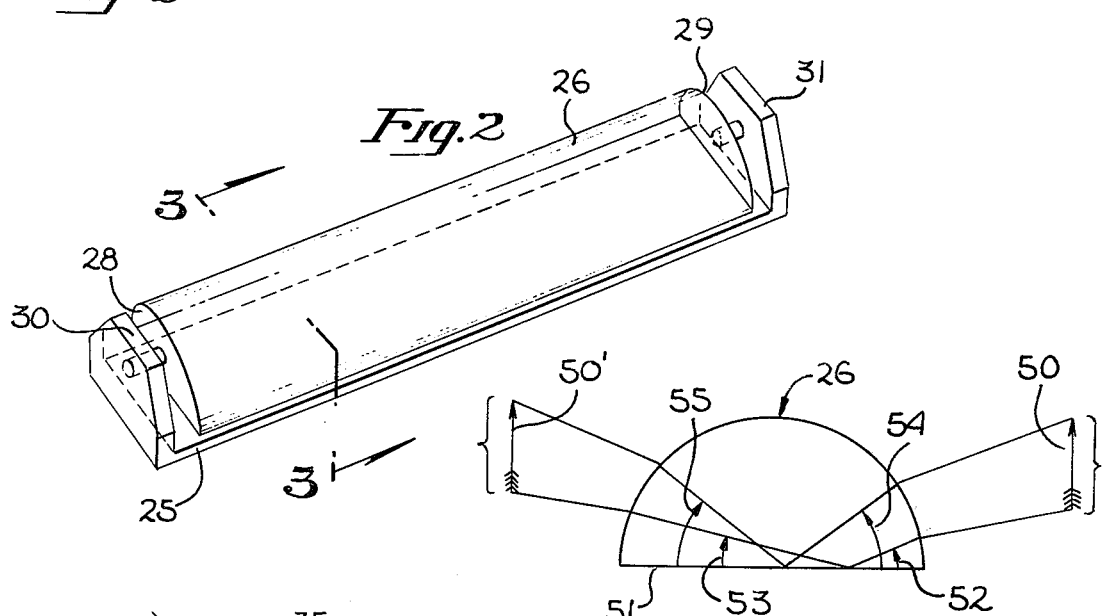
Fig. 2
Fig. 5a
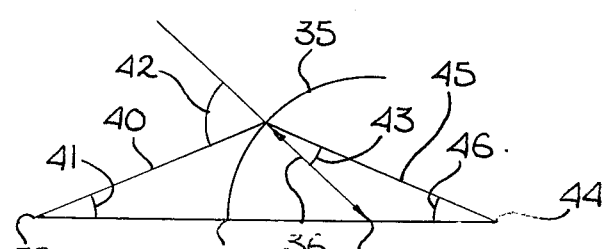
Fig. 4
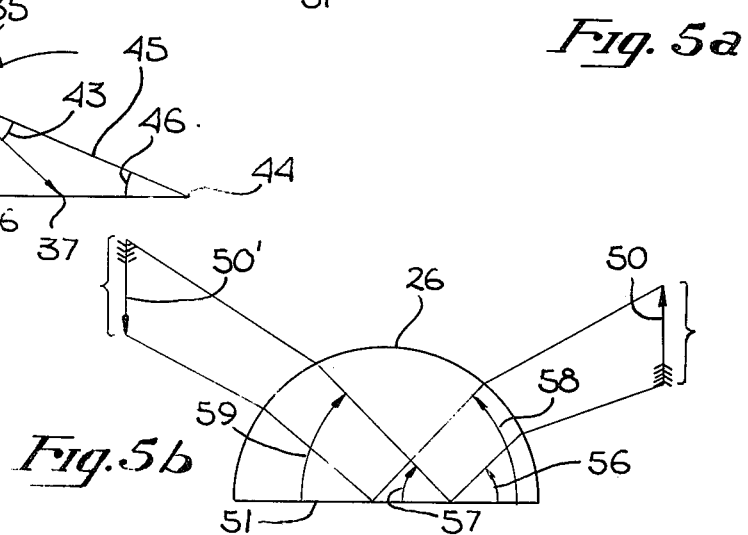
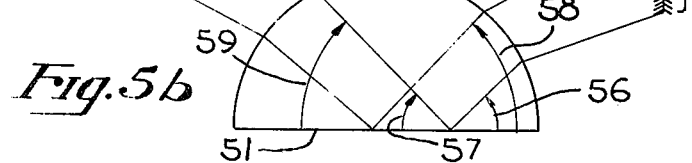
Fig. 5b

INSTRUMENT PANEL REFLECTING APPARATUS

BACKGROUND OF THE INVENTION

1. Field of the Invention

The present invention generally relates to optical systems and more particularly to those optical systems used to enhance the viewing of instrument indicia.

2. Prior Art

The present invention is utilized to enhance the viewability of a vehicle instrument panel that is obstructed by the steering column or wheel of the vehicle. In recent years, vehicles are being equipped with steering columns which are vertically adjustable in a manner which will permit ease of operation by the vehicle operator. The difficulty which has arisen through the use of such adjustable steering columns is the obstruction of the instrument panel of the vehicle. Since the steering wheel and column is adjustable in the vertical direction, there is no fixed relationship between the position of the steering wheel and column and the instrument panel. As a result, when a vehicle operator adjusts the steering column and wheel to adjust to the operator's requirements, there is a likelihood that the steering column or wheel will be positioned in such a manner as to obstruct the operator's view of the instrument panel. Since the speedometer of the vehicle is typically located in the vicinity of the steering column, the operator's obstructed view of the speedometer can cause great inconvenience and actually create the likelihood of danger to the operator.

Many devices are taught by the prior art to enhance instrument gauges, dials and other information bearing material. In general, substantially all of the devices taught by the prior art utilize a magnifying optical system to merely enlarge the data appearing on the instrument. It is clear that the problem sought to be solved by the present invention would in no way be resolved through the use of the typical instrument enlarging or reflecting devices taught by the prior art.

A problem sought to be solved by the present invention is based upon the existance of an obstructed view of the vehicle instrument panel because of the adjustability of steering columns and steering wheels of modern vehicles. Since a vehicle must be capable of being operated by operators of all sizes, the adjustable steering column has a large variation in available positions, but in all cases, the positioning at least includes vertical movement of the steering column and wheel. Since the instrument panel remains in a fixed position, movement of the steering column will include at least one position where vital instrument readings are obstructed by the steering wheel and column.

In order to solve the problems left unresolved by the prior art, the present invention utilizes a reflective member which is disposed below the instrument panel which is to be viewed and positioned intermediate the panel and the vehicle operator. It is clear that it would be dangerous to include any silvered or other reflective surface to implement the present invention. The present invention utilizes a clear, translucent member which can be properly positioned to receive the visual image of the obstructed instrument panel and reflect the image of same for viewing by the operator. The present invention is constructed without the necessity of typical light reflecting surfaces. A semi-cylindrical member is appropriately disposed in front of and below the instrument panel in a manner which will place the base reflecting surface at a position which is substantially the image object of the curved surface of the reflecting member. In this manner, a non-inverted reflected image of the instrument panel is provided the operator without the need for direct light reflecting surfaces and despite the fact that the direct view of the panel is obstructed by the steering column or wheel of the vehicle.

SUMMARY OF THE INVENTION

The present invention is essentially a reflecting apparatus which permits a vehicle operator a view of the instrument panel even where physical visual obstructions exist because of the adjustability of the vehicle steering column or wheel. A semi-cylindrical member of clear, translucent material is disposed in front of and below the instrument panel. In its most advantageous operation, the operator of the vehicle will have a direct and unobstructed view of the reflecting apparatus despite the fact that direct visual obstruction of the instrument panel is blocked. The present invention instrument panel reflecting apparatus is needed in those vehicles where a complete view of the instrument panel is obstructed because of the adjustability of the steering column. In modern vehicles, the position of the steering column and steering wheel of the vehicle can be adjusted thereby causing a variable obstruction to exist with respect to the operator and the instrument panel. In most commercial vehicles, the speedometer or other speed indicating instrument is located in the vicinity of the steering column and typically directed adjacent same. The speed indicating instrument can either include a straight dial or one which is curved along some predetermined arc, but in all cases, the speedometer is located in a position which is theoretically viewable by the vehicle operator. In modern vehicles, the steering column and coupled wheel are adjustable to permit ease of operation by the vehicle operator. Obviously, the adjustability of the steering column and wheel permits same to be adjusted to a proper height irrespective of the size of the vehicle operator.

While providing ease of operation for a vehicle operator, an adjustable steering column and wheel can clearly cause an obstruction intermediate the operator and instrument panel. Any obstruction between the operator and instrument panel can be dangerous since the operator can loose direct sight of the speedometer or other visual instruments. The present invention provides an alternative visual path between the vehicle operator and instrument panel to permit indirect observation thereof despite the position of the vehicle column or wheel. A pivotable reflecting member is disposed in front of and below the instrument panel. The vehicle operator, despite the positioning of the vehicle wheel or column will have a direct view of the reflecting apparatus irrespective of the position of the wheel. In the most vital application, the operator will have no view of the instrument panel while being able to view the present invention instrument panel reflecting apparatus. The pivotal member is a semi-cylindrical element having a substantially horizontal base at the lower most position of same. The surface of the reflecting member can be clear or rough but no enhancing reflecting surface such as silver or gold is necessary.

The reflecting member of the present invention apparatus is positioned such that the image of the instrument panel is directed at an angle of incidence which will insure that such image is directed toward the vehicle operator in a manner which will be non-inverted. The reflecting member will be pivotable about a point which does not constitute the center of curvature of the reflecting member thereby providing for alternate positions of the base reflecting surface. In this manner, the reflecting member of the present invention apparatus can be properly positioned to provide a reflected view of the instrument panel substantially independent of the size of the operator or the size of the vehicle instrument column.

It is therefore an object of the present invention to provide a reflecting apparatus for viewing a vehicle instrument panel.

It is another object of the present invention to improve the viewability of an instrument panel for a vehicle operator when the steering column and wheel of the vehicle are adjustable.

It is still another object of the present invention to provide an instrument panel reflecting apparatus which utilzies an unenhanced relfecting surface.

It is still yet another object of the present invention to provide an instrument panel viewing apparatus which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWINGS

FIG. 1 illustrates a schematic, side elvation view of a vehicle driver's compartment having an instrument panel reflecting apparatus mounted therein in accordance with the present invention.

FIG. 2 is a front perspective view of an instrument panel reflecting apparatus in accordance with the present invention.

FIG. 3 is a cross-sectional view of the present invention instrument panel reflecting apparatus taken through line 3—3 of FIG. 2.

FIG. 4 is a schematic, graphical view of reflection and refraction characteristics taken at spherical surfaces.

FIG. 5a illustrates the reflection of non-inverted images in accordance with the present invention.

FIG. 5b illustrates the production of an inverted image through the improper adjustment of the present invention instrument panel reflecting apparatus.

DESCRIPTION OF THE PRESENTLY PREFERRED EMBODIMENT

The use of the present invention can be best seen by reference to FIG. 1 wherein a side elevation view of a vehicle driver's compartment is shown, a form of the present invention instrument panel reflecting apparatus being mounted therein and being generally designated by the reference numeral 10. The vehicle compartment 11 is conventional in form being equipped with a seat 12 for the operator 13. The steering column 14 is located directly in front of operator 13, steering wheel 15 being mounted thereon. The representation of the vehicle compartment 11 shown in FIG. 1 is schematic in nature and deals with the typical addition of adjustable steering column 14. Arrow 16 indicates the adjustable position of steering column 14 and the attached wheel 15. Instrument panel 17 is located in front of operator 13 and includes the cluster of instruments which the operator must be able to view for safe operation of the vehicle. Included within instrument panel 17 is speedometer 18 which is typical of those instruments which are required for viewing in order to permit operator 13 to properly function within the vehicle.

The modern inclusion of an adjustable steering column 14 is for the purpose of permitting comfortable operation of the vehicle irrespective of the physical size of operator 13. As shown by adjustment 16, steering column 14 is adjustable along a vertical axis thereby providing for a position whereby operator 13 may have a field of vision 19 which is obstructed by the extremeties of wheel 15 thereby preventing view of speedometer 18.

Since field of vision 19 of operator 13 is obstructed by the upper extremities of steering wheel 15, means must be provided to permit operator 13 to view the visual reading of speedometer 18 in order to insure safe operation of the vehicle. As can be seen in FIG. 1, the present invention vehicle mounting apparatus 10 is mounted in front of and below speedometer 18 and is intermediate speedometer 18 and operator 13. As shown in FIG. 1, field of vision 19 includes direct observation of speedometer 18 although the operator is capable of seeing the mounted instrument panel reflecting apparatus 10. As stated hereinabove, an objective of the present invention is to insure viewability of speedometer 18 and the speed indications presented thereby despite the fact that the field of vision 19 of operator 13 is blocked or otherwise obstructed through adjustability of steering column 14 and the attached steering wheel 15. By coupling the present invention instrument panel reflecting apparatus 10 to the position shown in FIG. 1, and after adjustment of same in a manner which will be described hereinbelow, the operator will have visual observation of the indicia presented by speedometer 18 despite the fact that direct observation thereof may be precluded by steering wheel 15.

An understanding of the structure of the present invention instrument panel reflecting apparatus can be best gained by reference to FIG. 2 and FIG. 3. The present invention instrument panel reflecting apparatus includes a base 25 for securing same in the vicinity of speedometer 18. Base 25 is necessary where the physical space in the proximity of speedometer 18 or the adjustment of the present invention reflecting apparatus requires inclusion of same. Reflecting member 26 comprises a clear translucent member having a semicircular cross-section 27 as shown in FIG. 3. The ends 28 and 29 of reflecting member 26 are pivotally coupled to flanges 30 and 31 respectively of base 25. As will be described hereinbelow (FIG. 4), reflecting member 26 is pivotally coupled to base 25 at a location which is between the vertex and center of curvature of reflecting member 26.

The ability to properly reflect a non-inverted image of speedometer 18 or any other instrument reading to operator 13 can be best understood by reference to FIG. 4. FIG. 4 illustrates a schematic of a spherical surface 35 having a radius which is designated by the reference numeral 36. Spherical surface 35 separates two transparent substances having different indicies of refraction, the area shown to the right of surface 35 typically representing reflecting apparatus 26, the area to the left of spherical surface 35 representing the atmosphere. The center 37 of spherical surface 35 is typically called the center of curvature. The point 38 is intermediate the axis between center of curvature 37 and object 39, point 38 representing the vertex of spherical surface 35. Line 40 schematically designates a ray of light emitted from point 39 and forms an angle 41 with the axis. The angle of incidence between ray 40 and the normal to the surface 35 is a simple mathematical formulation and is represented by the reference numeral 42. Knowing the index of refraction of the separated transparent substances will yield angle 43 through the application of Snell's law. Once angle 43 is determined, the point 44 where the refracted ray 45 crosses the axis can be easily determined. Once point 44 is known, the angle 46 of refracted ray 45 is easily calculated. Although FIG. 4 illustrates a single ray of light 40 emanating from point 39, it is intended that all rays of light emanating from such point 39 will cross the axis at point 44 and thereby prevent magnification of the image projected.

Referring now to FIG. 5a and FIG. 5b, the manner of operation of the present invention instrument panel reflecting apparatus can be best seen. FIG. 5a illustrates an optimum poisitioning of reflecting member 26. Reflecting member 26 is disposed intermediate operator 13 and speedometer 18. In FIG. 5a, indicia 50 represents the projection of the data appearing on speedometer 18, image 50' constituting that which will be seen by operator 13. The positioning of reflecting member 26 is such that reflecting surface 51 is disposed substantially at that which corresponds to point 44 of FIG. 4. Although the angles of incidence and refraction shown in FIG. 5a and FIG. 5b are not to scale, the schematic depiction of the incidence of light from indicia 50 and the refraction thereof properly depicts the principle of the present invention. Rays of light emanating from indicia 50 will impinge upon the surface of reflecting member 26 and be reflected from reflecting surface 51. When reflecting member 26 is fabricated from a clear, translucent plastic, surface 51 will reflect light impinging thereon without the need of any enhancing reflecting material such as silver or gold. The ability to reflect light without the use of material such as silver and gold will preclude occurrence of potentially dangerous visual effects as might occur where highly reflective surfaces are used. As shown in FIG. 5a, the angle of incidence 52 with respect to surface 51 is equal to the angle of refraction 53. In addition, the angle of incidence 54 is equal to the angle of refraction 55. By positioning reflecting member 26 in the manner shown in FIG. 5a, the reflected image 50' will not be inverted and therefore can be properly observed by operator 13.

FIG. 5b illustrates an improper position for reflecting member 26. If reflecting member 26 is positioned with respect to indicia 50 such that the rays of light do not converge along the axis as defined in FIG. 4, the image 50' as shown in FIG. 5b will be inverted and result in the inability to effectively utilize the present invention. The resulting inverted image 50' as shown in FIG. 5b is the result of a reflection of the impinging light rays from reflecting light surface 51 in a manner shown in FIG. 5b. Since the angle of incidence 56 is equal to the angle of refraction 57 and since the angle of incidence 58 is equal to the angle of refraction 59, the image 50' must be inverted thereby precluding proper use of the present invention 10.

In order to properly position reflecting member 26, it is pivotable between flanges 30 and 31 (FIG. 2) about a point which is along the radius thereof, but not at the center of curvature represented by point 37 as shown in FIG. 4. In this manner, the positioning of reflecting surface 51 can be adjusted to reach the proper position shown in FIG. 5a while precluding the unsuitable position shown in FIG. 5b.

The present invention instrument panel reflecting apparatus 10 obviates a problem created by adjustable steering columns 14 installed in modern vehicles. The steering wheel 15 attached to such adjustable columns 14 can easily obstruct the operator's 13 view of the speedometer 18 or other instrument located on an instrument panel 17. The adjustability of column 14 can provide an obstructed view at any position depending upon the size of the operator 13. When the present invention instrument panel reflecting apparatus 10 is mounted within the view of operator 13, and by placing same in front of and below the indicia of speedometer 18 whereby the reflecting surface 51 is substantially at a point where the image of the indicia converges along the axis of the surface of reflecting member 26, operator 13 will view a non-inverted image of the data appearing on speedometer 18 even though the operator cannot directly see the instrument.

I claim:
1. An instrument panel reflecting apparatus for use in vehicles to provide visual observation of the instrument panel indicia, comprising a semicylindrical translucent reflecting member having an untreated base surface having a longitudinal length consistent with the instrument panel indicia and having a semi-circular cross-section, the circular surface of said reflecting member having a defined center of curvature and image converging point, said base member being disposed in the proximity of said instrument panel such that the image of the indicia converges substantially at said base surface whereby an operator of the vehicle can view a non-inverted reflective image of the indicia.

2. An instrument panel reflecting apparatus as defined in claim 1 wherein said instrument panel reflecting apparatus includes a base member, said base member being coupled to the instrument panel, said reflecting member being pivotally coupled to said base member, the base surface being substantially parallel to the instrument panel.

3. An instrument panel reflecting apparatus as defined in claim 2 wherein said reflecting member is pivotable along the radius of said semi-circular cross-section intermediate the center of curvature and the circular surface thereof.

4. An instrument panel reflecting apparatus for use in a vehicle to provide visual observation of instrument panel indicia comprising a reflecting member fabricated of translucent plastic and having an untreated base surface, said reflecting member having a longitudinal length consistent with the expanse of the instrument panel indicia and having a semi-circular cross-section defining a hemi-cylinder, the circular surface of said reflecting member having a defined center of curvature and an image converging point, said reflecting member being coupled to said instrument panel and pivotable about its longitudinal axis at a point intermediate the center of curvature and the curvature of the surface thereof, the base surface being disposed in the proximity of said instrument panel such that the image of the indicia converges substantially at said base surface whereby an operator of the vehicle can view a non-inverted reflected image of the indicia.

* * * * *